Figure 1:
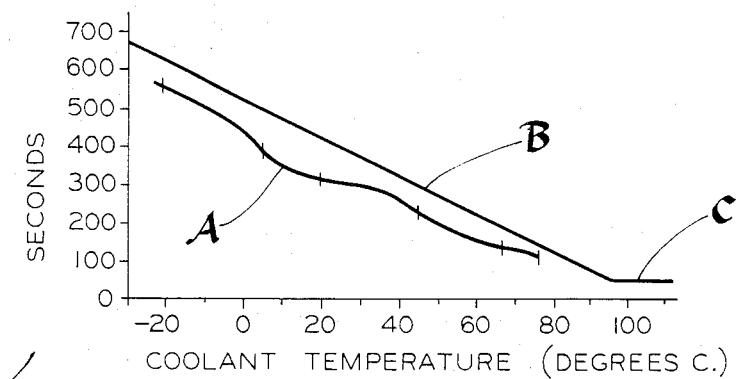

United States Patent [19]

Kidd et al.

[11] Patent Number: 4,503,419

[45] Date of Patent: Mar. 5, 1985

[54] OIL LEVEL DETECTION CIRCUIT

[75] Inventors: Robert C. Kidd, Warren, Ohio; Lawrence J. Porn, Flushing, Mich.

[73] Assignee: General Motors Corporation, Detroit, Mich.

[21] Appl. No.: 458,538

[22] Filed: Jan. 17, 1983

[51] Int. Cl.³ .......................... G08B 21/00; B60Q 1/00
[52] U.S. Cl. ..................................... 340/59; 340/52 F; 340/620; 340/622; 340/527; 73/292
[58] Field of Search ................. 340/59, 618, 620, 527, 340/52 F; 73/292; 374/170

[56] References Cited

U.S. PATENT DOCUMENTS

| | | | |
|---|---|---|---|
| 3,914,735 | 10/1975 | Guillaume | 340/52 F |
| 4,367,462 | 1/1983 | Dressler | 340/59 |
| 4,409,832 | 10/1983 | Konjedic et al. | 340/59 |
| 4,438,422 | 3/1984 | Nojiri et al. | 340/52 F |

Primary Examiner—John W. Caldwell, Sr.
Assistant Examiner—Hean Yuth
Attorney, Agent, or Firm—Warren D. Hill

[57] ABSTRACT

Low oil level in an engine crankcase is detected immediately after the ignition switch is turned on by a circuit including the ignition switch, an oil level sensor and a coolant temperature sensor wherein a control circuit generates an output if a low oil level signal is present when the ignition switch is turned on. An enabling circuit allows an output only if the ignition switch has been turned off for a sufficient time period to allow oil drain back to the crankcase. A time delay circuit responsive to coolant temperature and the ignition switch prevents a control circuit output after the ignition switch is turned off for a short period when the temperature is high and a long period when the temperature is low.

2 Claims, 2 Drawing Figures

OIL LEVEL DETECTION CIRCUIT

This invention relates to apparatus for detecting low oil level in an engine crankcase and particularly to an oil level detection circuit.

It has often been proposed to automatically monitor the crankcase oil level in an internal combustion engine to alleviate the requirement of periodic ullage rod measurements. Electrical liquid level sensors are known for sensing when the oil level is below a desired value. Electrical circuits employing such liquid level detectors have been proposed for oil level detection prior to engine operation. Heretofore a drawback of such circuits is that false low level signals may be produced in the event that the engine has been operating shortly prior to the oil level detection and the oil which has been circulating through the engine has not yet drained back into the crankcase. This phenomenon is especially noticeable when the engine is cold. Oil drains back to the crankcase rapidly when the engine is hot and an oil level test may be made shortly after turning off the engine, but if the engine is cold then a much longer time must elapse before making the oil level test.

It is therefore an object of this invention to provide an apparatus for detecting engine oil level only after the oil has drained back to the engine crankcase.

The invention is carried out by an apparatus including an oil level sensor, an engine ignition switch, an engine coolant temperature sensor and a control circuit connected to the switch and the sensors for generating an output after the ignition switch is on and a low oil level is detected and further including an enabling circuit responsive to the temperature sensor output for allowing an output after the ignition switch has been turned off for a variable temperature dependent time period. The invention further contemplates using a time delay element comprising a digital counter set according to a digital temperature reading so that the time period is short for high coolant temperature and long for low coolant temperature.

Figure 2:
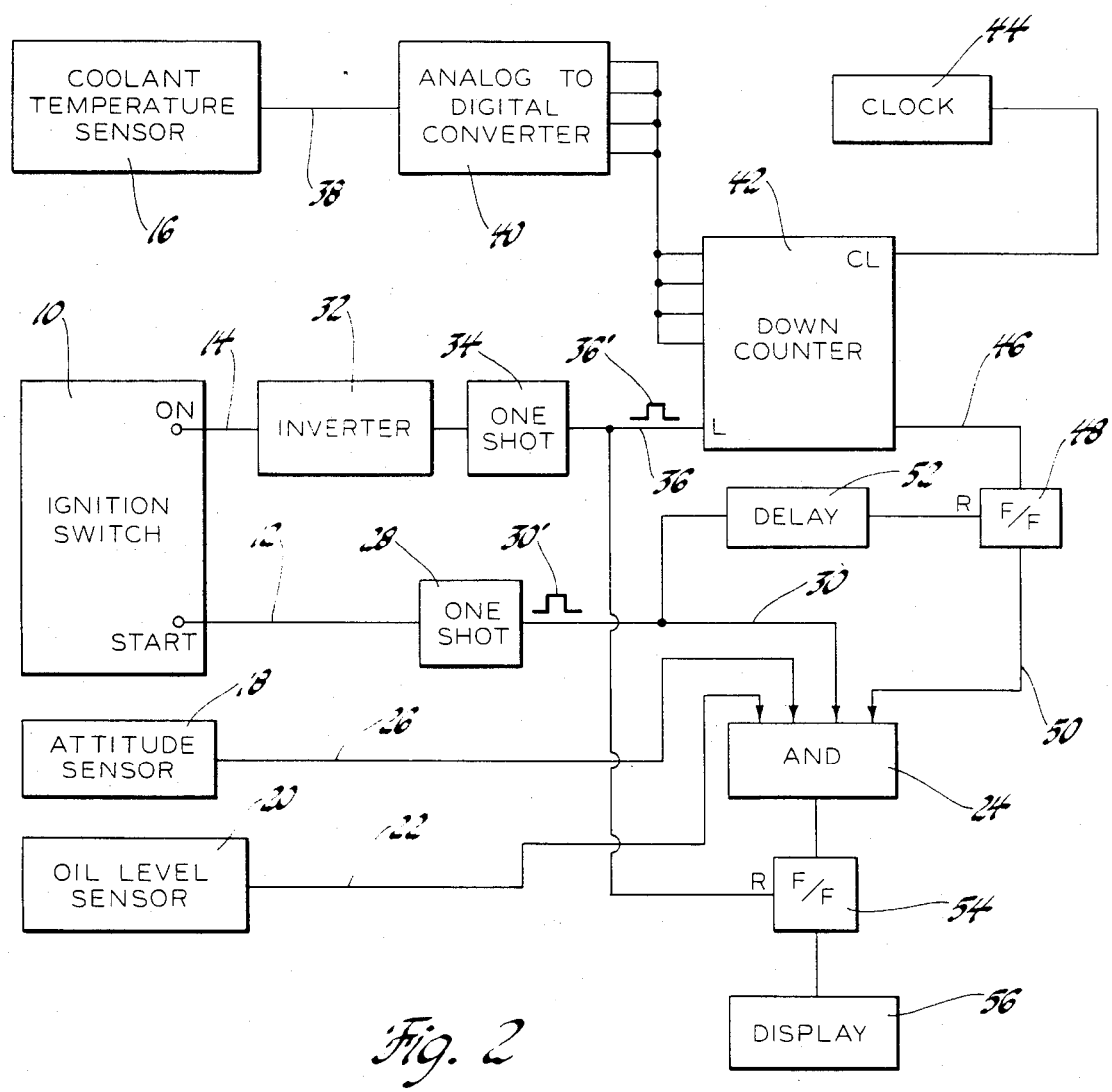

The above and other advantages will become apparent from the following description taken in conjunction with the accompanying drawings wherein:

FIG. 1 is a graph illustrating the dependence of engine oil drain back time on engine temperature and FIG. 2 is a block diagram of an apparatus according to the invention for detecting low oil level in an engine crankcase.

It is well known that a meaningful measure of the amount of oil contained in an engine cannot be made by monitoring crankcase oil level immediately after engine operation. This, of course, is due to the time lag caused by the oil draining back to the crankcase after operation of the engine. The particular time required will vary according to the design of the engine as well as the viscosity of the oil which in turn depends upon the oil temperature and the kind of oil. FIG. 1 depicts by curve A the results of oil drain back tests made on a 2.5 liter engine containing a particular oil. The graph shows the number of seconds required at different temperatures for oil to drain back to the crankcase after the engine is turned off. Thus at an engine coolant temperature of $-20°$ C. about 550 seconds were required for the oil to drain back into the crankcase whereas at a temperature of $50°$ C. 200 seconds were required. Thus for that engine the low oil measurements can be made after waiting the time shown on the graph after engine operation. Temperature sensitive circuitry incorporating a time delay following curve A can be employed in the apparatus according to the invention. However, a simpler approach is to approximate the curve A by the straight line B which allows a slightly longer time for oil drain back. While a nonlinear delay period can be implemented the linear delay time is more easily incorporated as a matter of circuit design. A minimum delay period, as represented by line C, should be provided to allow drain back time when the engine is hot.

FIG. 2 depicts a block diagram of the electrical circuit apparatus for measuring crankcase oil level taking into account the drain back time required after the engine has been turned off. The circuit is continuously energized by a battery connection, not shown, even though the ignition switch may be turned off. The apparatus includes an engine ignition switch 10 of conventional design having a start position which energizes a line 12 and an on or run position having a line 14. The circuit also includes a coolant temperature sensor 16, an attitude sensor 18 for sensing whether the vehicle is on a sufficiently level surface for a meaningful oil level check, and an oil level sensor 20. A control circuit assimilates the information from the switch and the sensors to operate a display. The oil level sensor 20 is connected by a line 22 to an AND gate 24 and produces a high signal when the oil level is low. The attitude sensor 18 is connected by a line 26 to the AND gate 24 and produces a high signal when the vehicle is substantially level. The ignition switch on line 12 is connected to the one shot 28 which produces on line 30 a single pulse symbolized at 30' as soon as the start line 12 is energized and before engine operation begins. The pulse 30' is applied to another input of the AND gate 24 so that the AND gate can produce an output only during the short window represented by the pulse 30'. The on line 14 from the ignition switch is connected to an inverter 32 which in turn is connected to a one shot 34 to produce on line 36 a short pulse 36'. The effect of the inverter 32 is to supply to the one shot 34 a positive signal when the ignition switch is turned off so that the pulse 36' is produced as soon as the engine is turned off. The coolant temperature sensor 16 provides an analog signal on line 38 to an analog to digital converter 40. The output of the converter 40 in digital form is fed to data inputs of a down counter 42. The line 36 is connected to a load input L of the down counter 42. A clock 44 is coupled to the clock input CL of the counter 42 to advance the counter from the preset number to zero. A zero output signal is supplied on line 46 which is fed through a flip-flop 48 which in turn has its output 50 connected to an input of the AND gate 24. A reset terminal R of the flip-flop 48 is connected to the line 30 through a delay circuit 52 for resetting the flip-flop shortly after the start pulse 30'. The AND gate 24 output is connected to a flip-flop 54 which has its output connected to a display 56 which may take the form of a lamp or other device for indicating a low oil level. A reset input R of the flip-flop 54 is connected to the line 36 for terminating the flip-flop output when the ignition circuit is turned off.

In operation the AND gate 24 will produce an output only when there is a positive input signal on all four lines 22, 26, 30 and 50. The line 22 carries a high signal when the crankcase oil level is low. The line 26 carries a high signal when the vehicle is at a substantially level attitude. The line 30 carries the high level pulse 30' for a brief period when the ignition switch is first moved to start position and prior to engine operation. Thus the display can only be turned on during the pulse 30'. The line 50 carries a high signal only when the ignition has been turned off long enough for the oil to drain back into the crankcase as determined by the coolant temperature and time delay circuit which together comprise an enabling circuit for the control.

The coolant temperature sensor 16 provides on line 38 a voltage which is inversely proportional to coolant temperature but has a minimum value at high temperatures corresponding to line C of FIG. 1. This voltage is converted to a digital number by the analog to digital converter 40. When the ignition switch is turned off the pulse 36' is fed to the load input of the down counter 40 to effect the entry of the digital signal from the converter 40 into the counter. Thus the number entered into the down counter 42 represents the coolant temperature and determines the delay time required for the counter to time out as it is advanced by the pulses from the clock 44. Thus the delay time shown by lines B and C of FIG. 1 is established for a given engine coolant temperature at the time of engine shut off. During the time after shut off and before the counter has reached zero the system is disabled thereby insuring that an oil level indication will not be displayed during that time delay. At the end of the delay time the counter 42 reaches a zero value and produces an output on line 46 to set the flip-flop 48 to deliver a high signal on line 50 thereby enabling the AND gate 24 to respond to the other inputs. Thus if the counter has timed out to enable the AND gate, the oil level is low, the vehicle attitude is level, and the ignition is moved to start position, all four inputs of the AND gate will be high and the display 56 will provide an indication. When the pulse 30' terminates the delay circuit 52 will provide a reset pulse to the flip-flop 48 to remove the high signal from the line 50. The AND gate output will terminate but the flip-flop 54 will maintain a signal to the display 56 until it is reset by a pulse 36' when the ignition switch is turned off.

It will thus be seen that according to this invention a circuit is provided for automatically monitoring the crankcase oil in an automotive engine each time the ignition switch is turned to start position provided that the vehicle has a level attitude and the engine has previously been turned off long enough to allow full oil drain back to the crankcase.

The embodiments of the invention in which an exclusive property or privilege is claimed are defined as follows:

1. Apparatus for detecting low oil level in an engine crankcase comprising:
    an oil level sensor for providing an oil level signal when the oil is below a given level,
    an engine ignition switch,
    an engine coolant temperature sensor for producing a temperature signal,
    a control circuit connected to the oil level sensor and the ignition switch for generating an output immediately after the ignition switch is turned on if the oil level sensor signal is present, and
    an enabling circuit in the control circuit connected to the ignition switch and to the coolant temperature sensor comprising a time delay circuit responsive to the coolant temperature signal for enabling the control circuit after the ignition switch has been turned off for a variable time period, the time period being short when the coolant temperature is high and long when the coolant temperature is low, whereby the control circuit is prevented from generating an output during the delay time.

2. Apparatus for detecting low oil level in an engine crankcase comprising:
    an oil level sensor for providing an oil level signal when the oil is below a given level,
    an engine ignition switch,
    an engine coolant temperature sensor for producing a temperature signal,
    a control circuit connected to the oil level sensor and the ignition switch for generating an output immediately after the ignition switch is turned on if the oil level sensor signal is present, and
    an enabling circuit in the control circuit connected to the ignition switch and to the coolant temperature sensor comprising a time delay circuit responsive to the coolant temperature signal for enabling the control circuit after the ignition switch has been turned off for a variable time period,
    the time delay circuit including a down counter, an analog to digital converter coupled to the temperature sensor and the counter for providing a digital input to the counter representing temperature, circuit means effective when the ignition switch is turned off to load the digital input into the counter, and clock means connected to the counter effective when the ignition switch is off to time out the counter over a time period determined by the digital input, the time period being short when the coolant temperature is high and long when the coolant temperature is low, whereby the control circuit is prevented from generating an output during the delay time.

* * * * *